H. T. MORRIS.
CONTROL SYSTEM.
APPLICATION FILED JUNE 4, 1915.
1,236,742.
Patented Aug. 14, 1917.
2 SHEETS—SHEET 1.
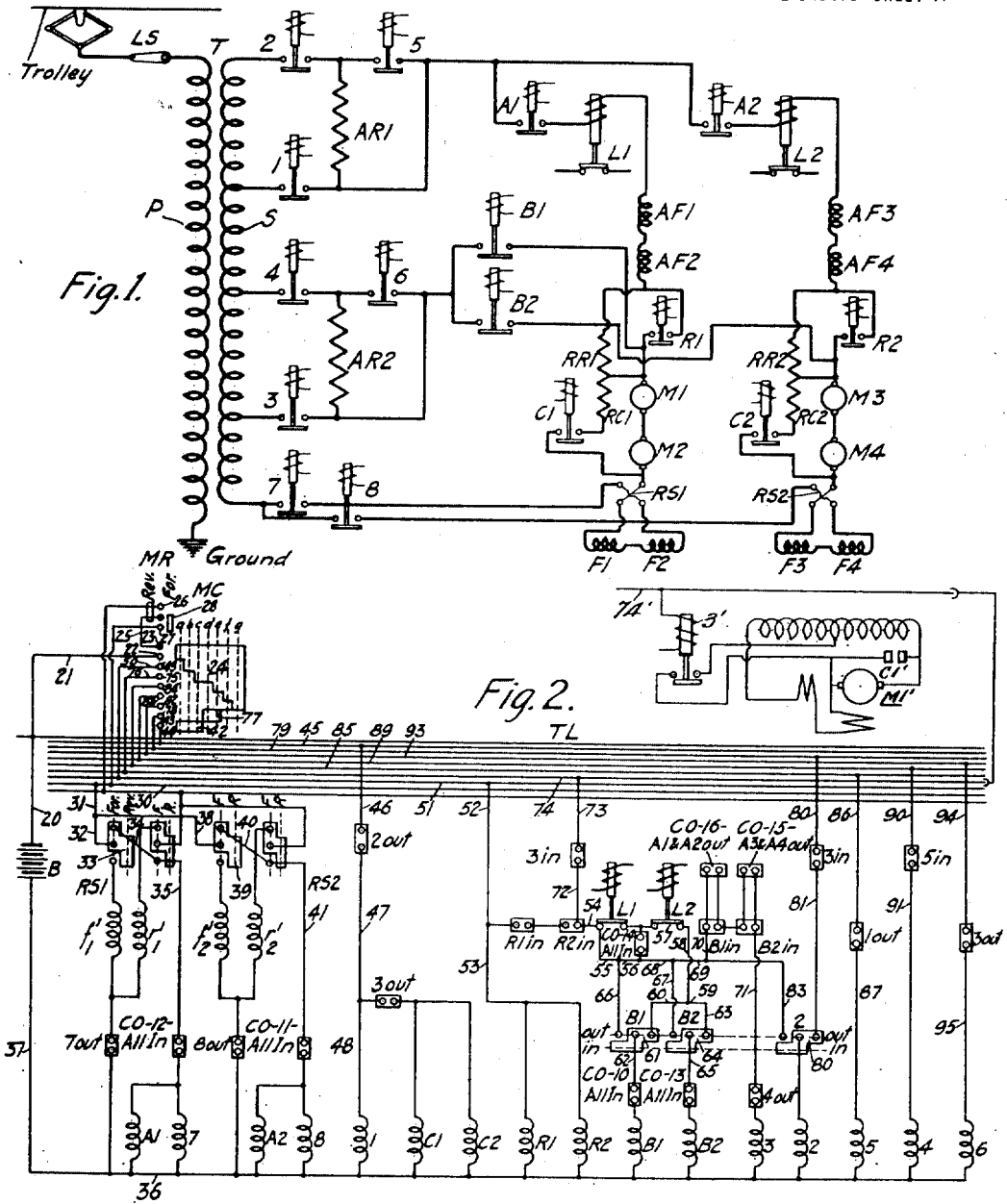
WITNESSES:
C. Fornander
W. R. Coley
INVENTOR
Hurd T. Morris.
BY
Wesley G. Carr
ATTORNEY

H. T. MORRIS.
CONTROL SYSTEM.
APPLICATION FILED JUNE 4, 1915.

1,236,742.

Patented Aug. 14, 1917.
2 SHEETS—SHEET 2.

WITNESSES:
R. J. Ridge.
W. R. Coley.

INVENTOR
Hurd T. Morris.
BY
Wesley G. Carr
ATTORNEY

UNITED STATES PATENT OFFICE.

HURD T. MORRIS, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,236,742.   Specification of Letters Patent.   Patented Aug. 14, 1917.

Application filed June 4, 1915. Serial No. 32,183.

*To all whom it may concern:*

Be it known that I, HURD T. MORRIS, a citizen of the United States, and a resident of Wilkinsburg, in the county of Allegheny and State of Pennsylvania, have invented a new and useful Improvement in Control Systems, of which the following is a specification.

My invention relates to systems of control and it has special reference to the control of alternating-current motors of the commutator type.

The object of my invention is to provide a system of the above-indicated character which shall embody certain novel features for effecting more reliable and satisfactory operation of the system.

Heretofore, in systems of the type employing alternating-current commutator motors that are initially connected as repulsion motors and subsequently are changed over to a doubly-fed connection, it has been common practice either to manually control the system throughout, whereby there is no assurance that the change to a doubly-fed connection is effected under proper or permissible commutating conditions, or to completely automatically control the system, whereby relatively expensive and complicated systems have obtained.

According to my present invention, I provide a system wherein the change from repulsion to doubly-fed connection of the motors is automatically effected under proper commutating conditions, and the remainder of the system is substantially manually controlled, thus, to a certain degree, obtaining the advantages of both types of control. Other novel control features of my invention will be hereinafter pointed out.

Figure 4:
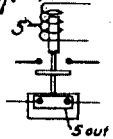
Figure 5:
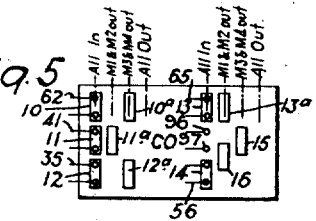
Figure 10:
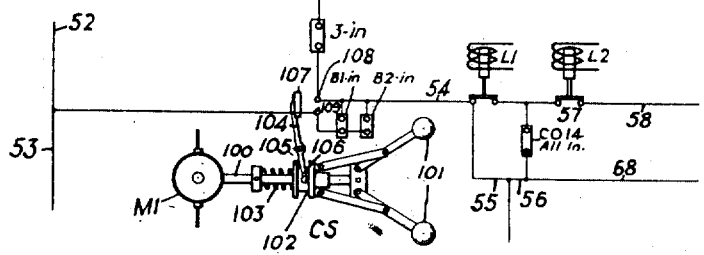

In the accompany drawings, Figure 1 is a diagrammatic view of the main circuits of a system of control embodying my invention; Fig. 2 is a diagrammatic view of the auxiliary governing system for the various motor-controlling switches shown in Fig. 1; Fig. 3 is a sequence chart of well-known form for indicating the sequence of operation of the various switches; Figs. 4 and 5 are diagrammatic views of certain pieces of control apparatus that are employed in connection with my invention; Figs. 6 to 9, inclusive, are simplified diagrams of various main-circuit connections that are utilized during the operation of the motors; and Fig. 10 is a diagrammatic view of a modification of the auxiliary system illustrated in Fig. 2.

Referring to Fig. 1 of the drawing, the system here shown comprises a pair of suitable supply-circuit conductors respectively marked "Trolley" and "Ground"; a transformer T provided with a primary winding P and a secondary winding S; a pair of alternating-current motors of the commutator type respectively having armatures M1 and M2, main or exciting field windings F1 and F2, and auxiliary or commutating field windings AF1 and AF2; a second pair of similar motors that are adapted to be connected in parallel relation with the first-mentioned pair and respectively having armatures M3 and M4, exciting field windings F3 and F4 and commutating field windings AF3 and AF4, all of the motors being adapted for operation from the secondary winding S of the transformer; a plurality of reversing-switches RS1 and RS2, preferably of the familiar electrically-controlled drum type, for respectively simultaneously reversing the electrical relations of the several pairs of motors; a plurality of motor-controlling switches 1 to 8, inclusive, A1, A2, B1, B2, C1, C2, R1 and R2, a suitable switch LS for connecting the primary winding P of the transformer to the supply circuit, a plurality of limit switches L1 and L2 of a familiar type having their actuating coils respectively disposed in circuit with the commutating field windings of the several pairs of motors; a plurality of resistors RC1 and RC2 that are employed for short-circuiting the pairs of series-connected armatures M1 and M2 and M3 and M4, respectively; and a plurality of accelerating resistors RR1, RR2, AR1 and AR2.

Referring now to Fig. 2, the auxiliary governing system shown comprises, in addition to the actuating coils for the various motor-controlling switches and the electrical interlocks of a familiar character that are respectively associated with certain of the switches, as illustrated in Fig. 4, a master controller MC that is adapted to occupy a plurality of operative positions $a$ to $g$, inclusive, a master reverser of a familiar type; a suitable source of energy, such as a battery B, for supplying energy through the master reverser and master controller to the various actuating coils; the auxiliary contact members of the limit switches L1 and L2, and a plurality of train-line conductors TL respectively corresponding to the several positions of the master controller, in accordance with customary practice.

In addition to the electrical interlocks that are movable with the respective motor-controlling switches, a plurality of similar interlocks or contact members CO—10 to CO—16, inclusive, are disposed upon a change-over or cut-out drum CO for the motors, as diagrammatically illustrated in Fig. 5. The drum is adapted to occupy a plurality of positions, as indicated by the respective legends that are employed in the figure.

Assuming that the switch LS is closed, that the change-over switch CO occupies its position marked "All-In"; that the master reverser occupies its forward position and that the master controller is actuated to its initial operative position $a$, the operation of the system may be set forth as follows: A circuit is first established from one terminal of the battery B through conductors 20 and 21, control fingers 22 and 23—which are bridged by contact segment 24 of the master controller—conductor 25, control fingers 26 and 27—which are bridged by contact segment 28 of the master reverser—conductor 29, train-line conductor 30, conductors 31 and 32, contact segment 33 of the reversing switch RS, in its forward position, conductors 34 and 35, interlock CO—12—All In, the actuating coils of the switches A1 and 7 and conductors 36 and 37 to the opposite terminal of the battery B. Another circuit is simultaneously established from conductor 31 through conductor 38, contact segment 39 of the main reversing switch RS, conductors 40 and 41, interlock CO—11—All In and the actuating coils of the switches A2 and 8 to the negative conductor 36.

A further circuit is completed from contact segment 42 of the master controller through control finger 43, conductor 44, train-line conductor 45, conductor 46, interlock 2—out, conductors 47 and 48 and the actuating coil of the switch 1 to conductor 36. Another circuit is established, at the same time, from conductor 47, interlock 3—out and the parallel-connected actuating coils of the switches C1 and C2 to conductor 36.

Figure 6:
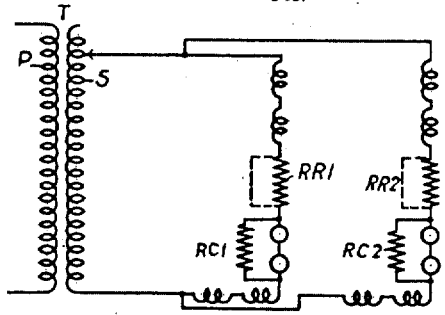

The motors are thus started into operation as repulsion motors, the resistors RC1 and RC2 being connected across the pairs of armatures M1 and M2, and M3 and M4, respectively, and the parallel-connected pairs of motors are respectively connected in series-circuit relation, with the accelerating resistors RR1 and RR2 across a suitable portion of the secondary winding S of the transformer T, as indicated by the solid lines in Fig. 6.

Upon movement of the master controller MC to its second operative position $b$, a circuit is established from the contact segment 24 through control finger 49, conductor 50, train-line conductor 51, conductors 52 and 53 and the parallel-connected actuating coils of the switches R1 and R2 to the negative conductor 36.

The resistors RR1 and RR2 are thus short-circuited to effect a predetermined degree of acceleration of the motors, as indicated by the dotted lines in Fig. 6.

The transition of the pairs of motors to the doubly-fed connection is then effected automatically in the following manner: A circuit is established from conductor 52, interlock R1—in and R2—in, as soon as the corresponding switches have closed, conductors 54, 55 and 56, interlock CO—14—All In, auxiliary contact members 57 of the limit switch L2, provided the motor current has decreased to a predetermined value to allow the limit switch to occupy its lower position, and conductor 58 to a junction-point 59, whence one circuit is completed through conductor 60, interlock 61—B1—out, conductor 62, interlock CO—10—All In and the actuating coil of the switch B1 to the negative conductor 36, and a second circuit is completed from the junction-point 59 through conductor 63, interlock 64—B2—out, conductor 65, interlock CO—11—All In, and the actuating coil of the switch B2 to conductor 36. As soon as the switches B1 and B2 are closed, holding circuits therefor are formed, comprising conductors 62, interlock 61—B1—in and conductors 66 and 55 for the switch B1, and comprising conductor 65, interlock 64—B2—in, and conductors 67, 68 and 56 for the switch B2.

As soon as the switches B1 and B2 have closed, a circuit is established from conductor 67 through conductors 69 and 70, interlocks B1—in and B2—in, conductor 71, interlock 4—out and the actuating coil of the switch 3 to the negative conductor 36. The armature short-circuiting switches C1 and C2 are then opened by reason of the exclusion from their control circuit of the interlock 3—out.

Attention is directed to the fact that the actuating coils of the limit switches L1 and L2 are respectively connected in circuit with the commutating field windings of the respective pairs of motors, whereby the transition of the motors to the doubly-fed connection, as just described, is effected when the current in the commutating field windings reaches the proper value to permit of good commutation during the transition, which will ordinarily occur when the motors have attained what may be termed their synchronous speed. It should also be noted that, when the change-over switch CO occupies its "All In" position, the auxiliary contact members of the limit switch L1 are short-circuited by the interlock CO—14—All In, whereby the transition to the doubly-fed connection is effected irrespective of the limit switch L1 and dependent solely upon the position of the limit switch L2. Inasmuch as the auxiliary contact members of the limit switches are connected in series-circuit relation, it will be appreciated that, unless the short-circuiting connection referred to was made, considerable time might be lost before the two limit switches would remain down simultaneously for a sufficient period of time to enable the switches B1 and B2 to close. The interlock CO—14—All In, thus prevents such loss of time because of fluttering operation of the limit switches and tends to effect more stable and reliable operation of the system during the transition.

Figure 7:
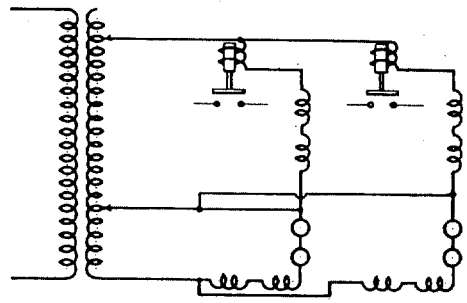
Figure 8:
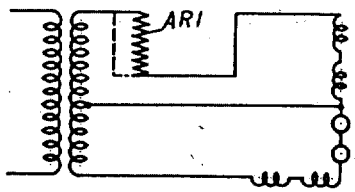
Figure 9:
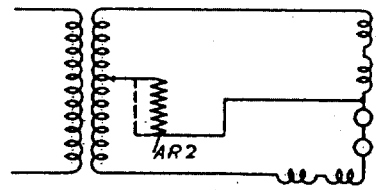

The doubly-fed connections of the respective pairs of motors are thus completed substantially as soon as the limit switch L2 drops to its lower position. The main circuit connections at this time are illustrated in Fig. 7.

Upon closure of the switch 3, a circuit is established from conductor 54, through conductor 72, interlock 3—in and conductor 73 to train-line conductor 74, which is connected to circuits in other vehicles of a multiple-unit train (not shown) to effect the closure of the switches that correspond to the switch 3 of this system substantially simultaneously with the closure thereof, thereby effecting the transition of the motors in the other vehicles to the doubly-fed connection at substantially the same time as the change is effected in the system illustrated. This is indicated in Fig. 2 wherein the train-line conductor 74 is shown connected to a train-line conductor 74' on another vehicle. A change-over switch 3' on the second vehicle is shown connected to be energized from the train-line conductor 74' and adapted to establish the double-fed connection in a motor M1' of the other vehicle.

It will be noted that the master controller MC has remained in its position $b$ during the transition of the motors to the doubly-fed connection, whereby the transition is effected automatically under the best commutating conditions, such automatic operation being preferable, as will be understood. However, if, for any reason, it is desired to otherwise energize the train-line conductor 74 to effect the transition of the motors in other vehicles, such operation may be effected by actuating the controller MC to its position $c$, whereupon the contact segment 24 engages control finger 75, and circuit is completed through conductor 76 to the train-line conductor 74. Thus, in the preferred operation, the transition of motors on other vehicles to the doubly-fed connection is accomplished automatically, and such transition corresponds to the inactive subsequent position $c$ of the master controller, although the controller, at the time, occupies its preceding position $b$.

When the master controller is moved to its position $d$, an energized contact segment 77 engages control finger 78, whence circuit is completed through train-line conductor 79, conductor 80, interlock 3—in, conductor 81, interlock 82—2—out and the actuating coils of the switch 2 to the negative conductor 36. The energizing circuit of the actuating coil of the switch 2 is then transferred to a holding circuit comprising interlock 82—2—in and conductor 83 which is connected to the conductor 69. The switch 1 is thereupon opened by reason of the exclusion, from its control circuit, of the interlock 2—out, and an additional portion of the transformer secondary winding S is thus connected through the current-reducing resistor AR1 to the parallel-connected pairs of motors to effect further acceleration thereof. The main circuit connections at this time, so far as the motors having the armatures M1 and M2 are concerned, are illustrated in solid lines in the diagram of Fig. 8.

Upon movement of the master controller to its position $e$, a circuit is established from the contact segment 24, through control finger 84, train-line conductor 85, conductor 86, interlock 1—out, conductor 87, and the actuating coil of the switch 5 to the conductor 36. The resistor AR1 is thus short-circuited by the closure of the switch 5, as indicated by the dotted line in Fig. 8.

When the master controller is moved to its position $f$, a circuit is established from the contact segment 24, through control finger 88, train-line conductor 89, conductor 90, interlock 5—in, conductor 91 and the actuating coil of the switch 4 to the conductor 36. The switch 3 opens upon the closure of the switch 4 by reason of the exclusion from its control circuit of the interlock 4—out. An additional portion of the secondary transformer winding S is thus included in series circuit relation with the resistor AR2 in that portion of the doubly-fed circuit that is connected to the armature windings of the respective pairs of motors, as indicated by the solid lines in Fig. 9.

The actuation of the master controller to its final operative position $g$ effects the engagement of the contact segment 24 and control finger 92, whence circuit is completed through train-line conductor 93, conductor 94, interlock 3—out, conductor 95 and the actuating coil of the switch 6 to conductor 36. The resistor AR2 is thus short-circuited by the switch 6, as indicated by the dotted lines in Fig. 9.

Assuming that, because of an accident or for any other reason, it is desired to cut the motors M1 and M2 out of operation, the change-over switch CO is moved to its second position marked "M1 and M2—out," whereby an interlock 11ª is substituted for the interlock 11 of the change-over switch, while the interlocks CO—10 and CO—12 are rendered inoperative by reason of the movement of the switch to its new position. Consequently, the switches A1, 7 and B1 cannot be closed, and only the circuits of the motors having the armatures M3 and M4 are operative.

Moreover, in the second position of the change-over switch CO, an interlock 13ª is substituted for the interlock 13, while the interlock CO—14 is excluded from circuit. At the same time, the interlock CO—16 engages control finger 97 and one of the control fingers that were bridged by the interlock CO—14, whereby the interlock CO—16 is substituted for the interlock B1—in and the switch 3 may thus be closed upon the closure of the switch B2, irrespective of the inoperativeness of the switch B1. Although the auxiliary contact members of the limit switch L1 are no longer short-circuited by the interlock CO—14, there will be no fluttering action of the limit switches, inasmuch as, since the circuit of the motors having the armatures M1 and M2 is dead, the switch L1 will remain in its lower position throughout the operation of the system.

If it is desired to exclude the other pair of motors from the circuit, the change-over switch CO is operated to its third position marked "M3 and M4—out" whereby interlocks 10ª and 12ª are substituted for interlocks 10 and 12, while the interlocks 11ª and 13ª are excluded from circuit. The switches A2, 8 and B2 are thus rendered inoperative, and only the circuit of the motors having the armatures M1 and M2 may be employed. At the same time, an interlock CO—15 bridges control fingers 96 and 97 of change-over switch, whereby the interlock CO—15 is substituted for the interlock B2—in to permit operation of the switch 3, irrespective of the inoperativeness of the switch B2. Since the interlock CO—14 is excluded from circuit and the limit switch L2 will remain down, the transition of the motors having the armatures M1 and M2 to the doubly-fed connection will depend upon the position of the limit switch L1, which, in the other positions of the change-over switch, is inoperative.

Referring now to Fig. 10, the portion of the system illustrated is adapted to be used in conjunction with the limit switches L1 and L2 to effect the transition of the motors to the doubly-fed connection when the current in the commutating field windings assumes the correct commutating value and when the speed of one or both pairs of motors concurrently reaches a predetermined value, preferably the synchronous speed hereinbefore referred to.

In general, the novel feature comprises the use of a centrifugal device CS which is shown as associated with the shaft 100 of one of the motors. The device CS embodies a plurality of weights or balls 101 which are suitably associated with a grooved sleeve 102 that is adapted to slide along the shaft under the above-mentioned speed conditions when the centrifugal force acting upon the weight 101 throws them outwardly, in accordance with the familiar action of flyball governors. A spring 103 is employed to suitably restrain the movement of the centrifugal device CS. A lever 104 is pivoted, intermediate its ends, upon a pin 105, and one end of the lever carries a roller 106 that is adapted to be actuated by the grooved sleeve 102. The other end of the lever is provided with an insulated contact member 107 that is normally disengaged from a plurality of stationary contact members 108 and 109.

Assuming that the motor has been initially started in the manner described in connection with Fig. 2, the transition of the pairs of motors to the doubly-fed connections is effected as follows: When the current in the commutating field windings decreases to a suitable value, the limit switch $L^2$ drops to its lower position, as hereinbefore set forth, and the lever 104 is moved in accordance with the increase of motor speed until the contact member 107 thereof bridges the stationary contact members 108 and 109 at the proper time. The bridging of the contact members 108 and 109 produces exactly the same result as the closure of the switches $R^1$ and $R^2$ which bring in the interlocks R1—in and R2—in, as set forth in connection with Fig. 2. The consequent closure of either or both of the switches $B^1$ and $B^2$ causes one or both of interlocks B1—in and B2—in to bridge the contact members 108 and 109, thereby insuring the closure of the switches during subsequent operation of the system.

It will be understood that the centrifugal switch described is merely illustrative of a principle and that any other suitable centrifugally operated switch may be employed to effect the same result.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a plurality of dynamo-electric machines and a plurality of limit switches for respectively effecting changes of connections of the several machines, of means for rendering one of said limit switches inoperative, and means for causing another switch to effect all said changes of connections under predetermined conditions.

2. The combination with a plurality of dynamo-electric machines and a plurality of limit switches respectively provided with sets of auxiliary contact members for effecting changes of connections of the several machines, the sets of contact members being connected in series-circuit relation, of means for short-circuiting one set of said auxiliary contact members under predetermined conditions, whereby all said changes of connections are effected by another limit switch.

3. The combination with a plurality of dynamo-electric machines and a plurality of limit switches respectively provided with sets of auxiliary contact members for effecting changes of connections of the several machines, the sets of contact members being connected in series-circuit relation, of a switching device having means for short-circuiting one set of said auxiliary contact members under predetermined conditions and for rendering the respective machine circuits inoperative under other predetermined conditions.

4. The combination with a plurality of dynamo-electric machines and a plurality of limit switches respectively provided with sets of auxiliary contact members for effecting changes of connections of the several machines, the sets of contact members being connected in series-circuit relation, of a multi-position switching device adapted, in one position that corresponds to operation of all machine circuits to short-circuit one set of said auxiliary members and adapted in other positions to render the respective machine circuits inoperative and to simultaneously render operative only that limit switch that corresponds to the operative machine circuit.

5. The combination with a dynamo-electric machine, and a plurality of controlling switches therefor severally having actuating coils, of a multi-position switching device for energizing said coils in a predetermined sequence, a plurality of train-line conductors, and means associated with certain of said switches for energizing one of the train-line conductors under predetermined conditions to effect connections corresponding to a predetermined inactive position of said switching device.

6. The combination with a dynamo-electric machine, and a plurality of controlling switches therefor severally having actuating coils, of a multi-position master controller for energizing said coils in a predetermined sequence, a plurality of train-line conductors respectively corresponding to the several positions of said controller, interlocking means associated with certain switches that close after the controller reaches a predetermined position for effecting the closure of a switch corresponding to the subsequent position, and interlocking means associated with the last-named switch for energizing one of the train-line conductors upon closure of the switch to effect connections in other systems that correspond to said subsequent position.

7. The combination with an alternating-current motor of the commutator type, and a plurality of controlling switches therefor severally having actuating coils, of a multi-position master controller for said coils adapted to initially effect operation of the motor as a repulsion motor, a plurality of train-line conductors respectively corresponding to the several positions of said controller and to some of said actuating coils, means for subsequently closing certain switches to effect the doubly-fed connection of the motor, interlocking means associated with said certain switches for effecting the closure of a switch corresponding to the subsequent controller position, and interlocking means associated with the last-named switch for energizing the train-line conductor that corresponds to said subsequent position upon closure of the switch to effect corresponding connections in other systems.

8. In a train-control system, the combination with a plurality of vehicles, each of which is provided with a propulsion motor of the alternating-current commutator type arranged for repulsion starting and for doubly-fed operation, of automatic means on each vehicle arranged for effecting the change-over of the connections of the motor of said vehicle under predetermined current conditions, and means whereby the operation of the first of said automatic means to effect a change-over of its respective motor substantially simultaneously effects the change-over of a motor on another vehicle.

9. In a train control system, the combination with a plurality of vehicles, each of which is provided with a propulsion motor of the alternating-current commutator type arranged for repulsion starting and for doubly-fed operation, of a limit switch on each vehicle arranged for effecting the change-over of the connections of the motor of said vehicle under predetermined current conditions, a train-line conductor traversing said vehicles, and means whereby the operation of the limit switch on any vehicle energizes said train-line conductor and effects the change-over of a motor on another vehicle.

In testimony whereof, I have hereunto subscribed my name this 27th day of May, 1915.

HURD T. MORRIS.

Copies of this patent may be obtained for five cents each, by addressing the "Commissioner of Patents, Washington, D. C."